United States Patent
O'Malley

(10) Patent No.: US 8,172,577 B2
(45) Date of Patent: May 8, 2012

(54) SYSTEM AND METHOD FOR KNOWLEDGE TRANSFER WITH A GAME

(75) Inventor: Donald M. O'Malley, Needham, MA (US)

(73) Assignee: Northeastern University, Boston, MA (US)

(*) Notice: Subject to any disclaimer, the term of this patent is extended or adjusted under 35 U.S.C. 154(b) by 1146 days.

(21) Appl. No.: 11/881,511

(22) Filed: Jul. 27, 2007

(65) Prior Publication Data

US 2008/0026359 A1    Jan. 31, 2008

Related U.S. Application Data

(60) Provisional application No. 60/833,586, filed on Jul. 27, 2006.

(51) Int. Cl.
*G09B 3/00* (2006.01)
(52) U.S. Cl. ......... 434/322; 434/323; 434/350; 434/362
(58) Field of Classification Search .................. 434/322, 434/323, 350, 362
See application file for complete search history.

(56) References Cited

U.S. PATENT DOCUMENTS

| | | | |
|---|---|---|---|
| 4,511,143 A | 4/1985 | Sankrithi | |
| 5,286,036 A * | 2/1994 | Barabash | 273/429 |
| 6,054,991 A | 4/2000 | Crane et al. | |
| 6,112,049 A * | 8/2000 | Sonnenfeld | 434/350 |
| RE38,432 E | 2/2004 | Fai et al. | |
| 6,688,888 B1 | 2/2004 | Ho et al. | |
| 6,751,620 B2 | 6/2004 | Orbanes et al. | |
| 6,907,223 B2 | 6/2005 | Murphy | |
| 6,935,954 B2 | 8/2005 | Sterchi et al. | |
| 6,966,831 B2 | 11/2005 | Miyaki et al. | |
| 6,968,375 B1 | 11/2005 | Brown | |
| 7,152,034 B1 | 12/2006 | Layng et al. | |
| 7,182,600 B2 | 2/2007 | Shaw et al. | |
| 7,195,490 B1 | 3/2007 | Scafidi et al. | |
| 2002/0160347 A1 * | 10/2002 | Wallace et al. | 434/322 |
| 2003/0015839 A1 | 1/2003 | Ignatiev | |
| 2003/0201603 A1 | 10/2003 | Pepper | |
| 2004/0137981 A1 | 7/2004 | Gauselmann et al. | |
| 2005/0239538 A1 * | 10/2005 | Dixon | 463/20 |

OTHER PUBLICATIONS

Morawska, Monika. MindMaze. Super-Memory.com [online], Oct. 3, 2000. [retrieved on Oct. 21, 2010]. Retrieved from the Internet: <http://www.super-memory.com/sml/colls/mindmaze.htm>.*

(Continued)

*Primary Examiner* — Xuan Thai
*Assistant Examiner* — Jerry-Daryl Fletcher
(74) *Attorney, Agent, or Firm* — Weingarten, Schurgin, Gagnebin & Lebovici LLP

(57) ABSTRACT

An educational maze navigated through responses to questions provided at points in the maze enhances factual assimilation and retention for the user. The user selects responses to travel through the maze and is not immediately informed whether the selected responses are correct. Various indications can be provided to inform the user about the correctness of responses or whether they are on a path towards the maze exit. The indications may be dead ends, loops, suggested reference materials or other information that tends to assist the user in assimilating facts or navigating the maze. The user may receive a reward for providing correct responses or successfully completing the maze. The problem-solving and cognitive judgment skills applied to navigate the maze tends to help users assimilate and retain the factual information represented by the queries and responses.

33 Claims, 3 Drawing Sheets

OTHER PUBLICATIONS

Nelson, Audie. MS Encarta 97 Encyclopedia. Alamo PC Organization [online] Sep. 8, 2003. [retrieved on Oct. 21, 2010]. Retrieved from the Internet: <http://web.archive.org/web/20030908083508/http://alamopc.org/pcalamode/reviews/archive1/rev303.html>.*

Dungeons & Dragons, Wikipedia, en.wikipedia.org/wiki/Dungeons_&_Dragons.

Prensky, Mark, "Fun, Play and Games: What Makes Games Engaging," Digital Game-Based Learning, (McGraw-Hill, 2001).

Tye, Kay M.; Janak, Patricia H., "Amygdala Neurons Differentially Encode Motivation and Reinforcement" (Abstract), Journal of Neuroscience.

El-Amamy, Heather; Holland, Peter C. "Dissociable effects of disconnecting amygdale central nucleus from the ventral tegmental area or substantia nigra on learned orienting and incentive motivation" (Abstract), European Journal of Neuroscience, vol. 25, No. 5, Mar. 2007, Blackwell Publishing.

Satoh, Takemasa et al., "Correlated Coding of Motivation and Outcome of Decision by Dopamine Neurons" (Abstract), Journal of Neuroscience.

Whitehouse, Kendall, "Web-Enabled Simulations: Exploring the Learning Process," Educause Quarterly, No. 3, 2005, pp. 20-29.

Chatham, Ralph E., "Games for Training," Communications of the ACM, vol. 50, No. 7, Jul. 2007, pp. 36-43.

Mayo, Merrilea J., "Games for Science and Engineering Education," Communications of the ACM, vol. 50, No. 7, Jul. 2007, pp. 30-35.

Zyda, Michael, "Creating a Science of Games," Communications of the ACM, vol. 50, No. 7, Jul. 2007, pp. 26-29.

Benyon, David, "Beyond Navigation as Metaphor," ECDL '98, LNCS 1513, pp. 705-716, 1998.

Covington, Martin V, "Goal Theory, Motivation, and School Achievement: An Integrative Review," Annual Review of Psychology, vol. 51, (Abstract) 2000.

Rousos, Peter, "Instructional aids hold revenue potential outside biotech 'box'," Technology Transfer Tactics, vol. 1, No. 1, May 2007, pp. 1, 5-7.

Covington, Martin V., "Goal Theory, Motivation, and School Achievement: An Integrative Review," Annual Review of Psychology 2000, 51:171-200.

* cited by examiner

SYSTEM AND METHOD FOR KNOWLEDGE TRANSFER WITH A GAME

CROSS REFERENCE TO RELATED APPLICATIONS

This application claims priority under 35 U.S.C. §119(e) of U.S. Provisional Patent Application No. 60/833,586, filed Jul. 27, 2006.

STATEMENT REGARDING FEDERALLY SPONSORED RESEARCH OR DEVELOPMENT

N/A

BACKGROUND OF THE INVENTION

The present invention relates generally to a system and method for transferring knowledge in the context of a game, and relates more particularly to a system and method for game-based education or training.

The concept of using games to assist in education or training has been implemented in a variety of settings, with a variety of techniques. One advantageous aspect of education by employing a game is that the incentives or rewards provided in a game setting can increase motivation, which is an important factor in learning and cognitive advancement. With the use of computer and computer networks, educational and training exercises are made available on a flexible and widespread basis. Computer program applications are available for a variety of disciplines to help educate and train the user, without necessarily having an instructor be present. These types of computer based education and training applications tend to be somewhat rote, as they rely on rote repetition for knowledge assimilation.

Computer systems have also been used to host recreational games or entertainment on an individual or group basis. For example, some internet based games permit players at computer terminals around the world to cooperatively join in a group oriented game. An example of such a game is an adventure game in which one or more players overcome various obstacles or attain certain goals within the context of the adventure setting, sometimes being rewarded for teamwork. One aspect often included in these types of games is a maze-like setting, which the player or players navigate to attain certain goals, such as finding an object or engaging an opponent. In these types of settings, the players choose the path to take through the labyrinth or maze. These types of games are well-known for their motivational impact on the players, often causing players to spend hours of time attempting to solve a problem, overcome obstacles or attain goals that are presented in the game.

A variety of other maze-like games are also available in various settings, such as gaming or slot machine environments. For example, U.S. Patent Application Publication No. 2004/0137981 provides a game with a matrix having an entrance and an exit, with awards given on the basis of various criteria related to the maze, such as path taken or patterns formed. With the widespread popularity of these types of recreational games, it should be possible to model "serious" games for education and training after some of the elements presented in popular recreational games. By including elements of recreational games in an educational or training game application, a user already familiar with popular recreational games may be more inclined to be motivated to learn or to train using the educational game because of some of the same motivational rewards that are offered in relation to recreational games.

Computer systems for educating or training individuals in a game setting have been developed for wide-spread use, typically in the context of games for children, to learn fundamental subjects such as the alphabet, spelling, numbers and simple arithmetic operations. In addition, a number of computer system applications provide education related entertainment or games for educating and training students in a variety of disciplines. For example, U.S. Pat. No. 6,688,888 provides a computer aided learning system and method that permits a student to answer questions, provide feed-back and reach defined milestones to receive a reward, typically in the form of entertainment.

An example of an educational game is provided with the encyclopedia program called Encarta published by Microsoft® Corporation, which combines a question and answer format with a labyrinth-type setting. The user provides answers to questions posed by the program, and their representative location in the labyrinth remains the same if a wrong answer is given. If a correct answer is given, the user may choose the direction in which to move in the labyrinth.

Another type of game to be used for educational purposes is accessible on the internet and referred to as EnglishMaze. The game is not in the form of a maze, but rather presents the user with a series of questions designed to familiarize the user with typical social situations in which appropriate responses are desired. The exercise leads to a successful outcome if the user correctly answers the questions related to the given social situation. If the user incorrectly answers a question, they may be informed of the incorrect response immediately or after several other questions are posed, or may be informed that there may be a better answer, i.e. the game provides a hint that the answer selected may not be correct. After being informed of an incorrect answer, or an unsuccessful outcome, the user is informed of their error, and permitted to respond to the question or series of questions again. The choices provided in the given situation are typically subjective in nature, such as choosing an appropriate topic of conversation or an appropriate dish for a hosted dinner party. That is, the user is not required to learn factual information to navigate the presented situations, but rather is encouraged to enhance an intuitive understanding of the use of English in a given setting.

One of the challenges in educating or training a student in numerous disciplines is to have the student assimilate a large body of factual information. In addition, the student integrates the assimilated facts into an appropriate conceptual framework. Often, the volume of factual information to be conveyed to students poses a significant dilemma for teachers and instructors with respect to the challenges of conveying facts versus assisting students in understanding relationships concerning factual information and integrating the knowledge.

BRIEF SUMMARY OF THE INVENTION

In accordance with an exemplary embodiment of the present invention, a system and method is provided for educating, training or testing one or more users in a given discipline through an educational maze-type game. The disclosed maze includes a number of points or nodes that are interconnected to define pathways through the maze. Each node represents a factual inquiry where information is presented to act as a query to the user. Responses to the presented information at each node moves the user to another node. If the user responds correctly, they advance relative to their current position towards the exit of the maze. If the user responds incorrectly, they are directed to a node that is not necessarily closer to the exit. Importantly, the user is not immediately informed whether they have provided a correct response or not. In addition, the user is not immediately informed whether they are proceeding towards the exit or not. Instead, the user advances along a logical path that may take a number of forms, including loops, dead ends, "jumps" and any other type of path construct as may be employed in a maze architecture. A jump is a movement through the maze that is not necessarily linear, or one that may skip nodes.

A distinction is made in the maze between the logical maze path, which is the underlying maze architecture, and the physical maze or represented position and paths that the user appears to be transiting. While the logical maze can have an arbitrary difficulty level, based on statistical probability and logical architecture, the physical maze tends to be more simplified as existing in two-dimensional or three-dimensional space.

In accordance with an exemplary embodiment, a physical maze or labyrinth is traversed with responses to queries on a given topic or within a given discipline. A representation of a physical maze is presented to the user showing a starting point and having no indication of an exit point. The user attempts to find the exit by correctly responding to queries posed at different points in the maze. The direction taken in the physical maze is dependent upon the response given to the particular query, and the logical paths available in the maze at the node corresponding to the query. For example, a node can have multiple exit paths dependent upon responses to a given query, with correct or better responses tending to move the user closer towards the maze exit, and incorrect or poorer choices tending to move to the user away from the maze exit, or into areas of the maze representing backtrack loops or dead ends.

The difficulty of the maze can be adjusted, and can be based on heuristics, feedback from users or statistical analysis, including statistical difficulty of a given query. Statistical difficulty of a question refers to the difficulty of the format of the question, a true/false question being a less difficult format than a multiple choice question with more than two choices. Other types of question formats, such as presenting a large amount of information and asking a specific question concerning the information content or selecting from multiple groups of statements, for example, provide a range of difficulty that can be used with a statistical difficulty level of maze configuration to provide a relatively specific, adjustable overall maze difficulty. The logical maze architecture can be adjusted to a given level of difficulty to obtain a certain level of assurance that a user cannot reach a maze exit by guessing correct responses to queries posed at the various nodes in the maze.

According to an embodiment, a user responding to given queries can be presented with information that tends to reveal aspects of the user's progress or performance. For example, if a user provides an incorrect response to a query, they can be presented with help, hints or reference material. The presentation of help, hints or reference material indicates to the user than an incorrect response was given previously in traversing the maze. The presented information can be in the form of feedback, such as directly informing the user that a question was answered correctly or incorrectly. The feedback may also be inferential, such as may be provided with the content of queries as the user proceeds on a path towards or away from the exit of the maze. In addition, the maze architecture can serve as feedback for the user, such as by providing a dead end to the path the user is on to let the user know an incorrect response was given previously. A maze loop can also serve as feedback, such that the user sees repeated maze locations to let them know they have responded incorrectly to a prior question. The logical maze structure can also provide different paths for a user to jump to different parts of the maze depending upon maze location, difficulty of the query, past performance, and other factors tending to indicate how well the user is responding to the queries posed in the maze.

According to another embodiment, multiple users, groups of users, or multiple groups of users can attempt to transit the maze in a test, competition or collaborative environment. For example, the maze can be posted on a website to be accessed through the internet, and permit multiple users to attempt to transit the maze, individually or in groups. A classroom or group exercise can be employed to transit the maze through consensus responses, or different, serial individual responses, for example.

In accordance with an exemplary embodiment, a logical maze architecture is provided as a template for inserting discipline related content. An instructor can develop and insert queries for each of the nodes of the maze and provide appropriate responses to direct the user to other nodes in the maze in dependence upon correct or incorrect responses from the user. A number of different maze architectures can be provided depending upon the difficulty level desired by the instructor or the topics of instruction, for example. In addition, a tool to create a logical maze architecture can be provided to permit an instructor to design maze architecture specifics.

In accordance with another exemplary embodiment, the disclosed system and method provides feedback to an instructor or user indicating how well the user responded to queries or transited the maze. The feedback can be in the form of a report to include a number of users or groups of users, and statistics for correct responses to each query, for example.

BRIEF DESCRIPTION OF THE SEVERAL VIEWS OF THE DRAWINGS

The invention is described in greater detail below, with reference to the accompanying drawings, in which.

DETAILED DESCRIPTION OF THE INVENTION

This application claims priority under 35 U.S.C. §119(e) of U.S. Provisional Patent Application No. 60/833,586 filed Jul. 27, 2006, the entire contents of which is hereby incorporated herein by reference.

In many different academic, technical and professional disciplines, individuals and sometimes groups are challenged with learning large bodies of factual information. In addition, the individuals or groups integrate the learned facts into an appropriate conceptual framework in accordance with practicing their discipline. In some disciplines, the amount of factual information to be learned or assimilated is voluminous, and increases over time. The volume of facts to be assimilated is a significant issue for teachers or instructors, who are tasked with conveying facts as well as helping students learn relationships among facts and integrate knowledge.

Neural circuits in human brains, and how they create new concepts or integrate knowledge, are not presently well understood. Studies with animals have shown that neural reward systems and motivation do contribute significantly to learning and assimilation processes. Such studies include: "Amygdala neurons differentially encode motivation and reinforcement", Tye K M, Janak P H, Journal of Neuroscience, Vol. 27, pp. 3937-3945 (2007); "Dissociable effects of disconnecting amygdala central nucleus from the ventral tegmental area or substantia nigra on learned orienting and incentive motivation", El-Amamy H, Holland P C, European Journal of Neuroscience, Vol. 25, pp. 1557-1567 (2007); and "Correlated coding of motivation and outcome of decision by dopamine neurons", Satoh T, Nakai S, Sato T, Kimura M, Journal of Neuroscience, Vol. 23, pp. 9913-9923 (2003). For example, the modulation of synaptic efficacy, i.e., synaptic strength, and formation of new synaptic connections, which tend to support learning processes, can depend upon an energy level of the neuronal synapse. It is possible that the energy level of the neuronal synapse can be increased by endogenous neural reward systems. Accordingly, intrinsically motivating environments or situations, such as an apparent innate desire to play games and solve puzzles or overcome obstacles, can contribute to assimilation of knowledge. The organization of factual information into a game or puzzle can therefore provide a certain amount of motivation to master the information and solve the puzzle or successfully complete the game. By incorporating discipline specific information into the game or puzzle, the learning process can be enhanced by increasing motivation and engaging the neural reward systems. The enhancement to synaptic information processing mechanisms can be significant. Indeed, the motivations provided in a game or puzzle setting can cause players, or students, to think "deeper" or "harder" about the subject matter presented in the game or puzzle to enhance the process of learning.

Figure 1:
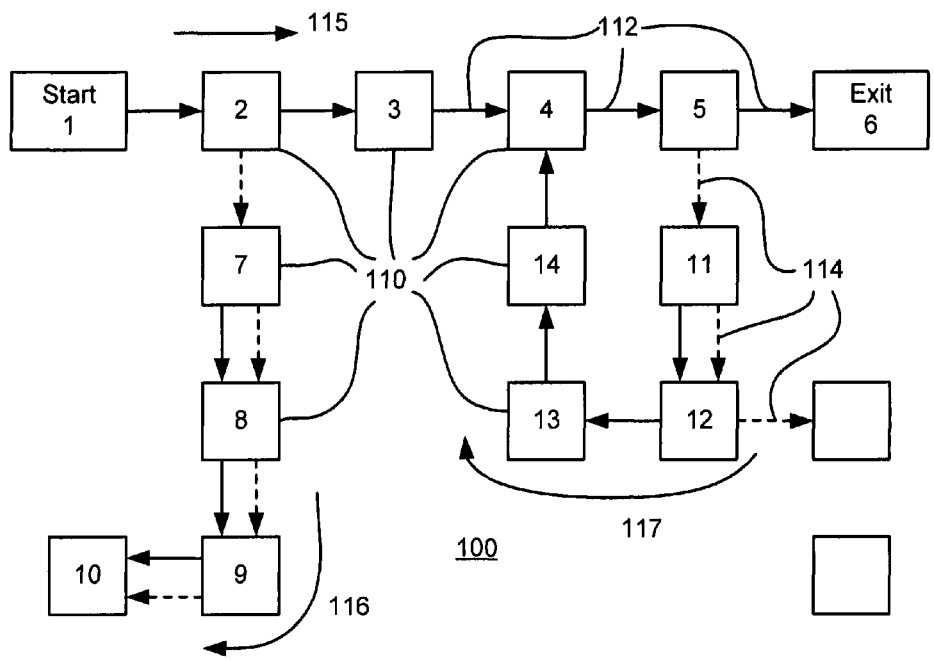
FIG. 1 is a diagram of a maze in accordance with an exemplary embodiment of the present invention.

In accordance with the present invention, an educational game is provided to assist a student or trainee with assimilation of facts in a challenging and engaging format that provide motivational factors and stimulates different parts of the brain to contribute to assimilation of facts. Referring now to FIG. 1, an educational game is presented as a maze 100 with a series of nodes designated as nodes 110. In maze 100, a user moves from node to node as indicated with arrows 112, 114. Some arrows 112 are solid, representing correct responses to the query in the corresponding node from which arrow 112 exits. Arrows 114 that are dashed represented incorrect responses to queries in the nodes from which the dashed line arrows 114 exit. Maze 100 is a logical architecture for a maze, and due to its size and simplicity, can also be viewed as a physical maze. Each node 110 includes a query to obtain a response from the user. The query and response can take a variety of forms, as discussed in greater detail below. As the user enters a response, they move to a new node, which can be closer to or further away from the exit node 6. According to an exemplary embodiment, the nodes 110 may be implemented as web pages in an intranet or internet, with each response being implemented as a link to the next appropriate node in accordance with the maze architecture. In maze 100, a main path 115 provides a direct route from the start node 1 to the exit node 6, which the user can travel along with five consecutive correct responses. Incorrect answers, indicated by dashed arrows 114, lead to side branches that tend to take the user on a path away from the exit of maze 100. An important aspect of the present invention is that the user is not aware of whether or not they are on the correct path in the maze, so any of the paths through the maze may appear to be correct up to a certain point.

For example, maze path 116 illustrated as passing through nodes 2 and 7-10 may emulate a correct path, in that the user is not informed whether the answers to the posed queries are correct, but simply moves through the maze in what may appear to be an arbitrary path. As is illustrated in maze 100, path 116 is a dead end, which may indicate to the user at the end of path 116 that an incorrect response was given somewhere previously in the maze. In the exemplary embodiment of maze 100, the user travels along path 116 through nodes 7-10 regardless of whether correct or incorrect responses are provided by the user. At node 10, the user may be instructed that an error was made previously, and that they may wish to begin maze 100 from the start.

A path 117 illustrates a loop provided in maze 100, starting from node 5 and returning the user to node 4 on main path 115. Path 117 initially takes the user away from the maze exit, but returns the user closer to the exit with additional correct responses. For example, if the user provides a correct response in node 12, they advance to node 13 and can return to node 4, closer to exit node 6. Again, the user is not informed whether they are on the correct path, or if they are providing correct responses to the posed queries.

The movement of the user in maze 100 is dictated by the maze architecture and the responses the user provides to the queries posed at the given nodes. Accordingly, the user does not choose the direction through the maze, and understands that the correctness of their answers contributes to correctly navigating the maze. With this arrangement, the user has additional incentive and motivation to apply judgment as well as problem solving skills to the factual information provided in the query to be able to move along a path towards the maze exit. By bringing to bear a number of different types of cognition, the user is intellectually stimulated to a greater extent than when trying to assimilate factual information through rote memorization. In this way, the concept of the present invention emulates some of the responses in a recreational game where the user is challenged on different cognitive levels. The user's motivation and engagement with the factual information is therefore enhanced.

With respect to maze 100, each of nodes 110 may have one or more correct or incorrect responses, each of which may direct the user to a separate node when chosen. Alternately, or in addition, one or more responses for a given node 110 may be directed to a given node 110 upon being chosen, so that there is the possibility of more than one correct or incorrect response.

According to an exemplary embodiment of the present invention, various hints or assistance may be provided to the user to indicate the user is on a path towards the exit or away from the exit. In the above example, the user reaches a dead end or enters a somewhat repetitive loop to be informed of whether they are on a path toward the maze exit. According to one aspect of the invention, the nature of the questions contributes to indicating whether the user is heading toward or away from the exit. This optional design feature for the educational maze maps different knowledge structures onto the structure of the information space being used.

The following multi-choice question provides an example.
Q. Particles of light are called:
A. a) photons
b) muons
c) klingons
d) vorlons
e) quarkons Choosing correct response a) transfers the user to a node that is closer to the exit. Choosing another answer puts the user on a path away from the exit. If the user chooses response a), the next query addressed to the user continues to be topical, such as the following multiple-choice question.

Q. A photon's energy is:
A. a) proportional to its frequency
b) proportional to its frequency squared
c) inversely proportional to its frequency
d) inversely proportional to its frequency squared
e) equal to its frequency squared Choosing correct answer a continues the user on a path toward the exit. Choosing other responses may direct the student on paths away from the exit.

With respect to the first question, an incorrect response can cause the user to be directed to a node in which the query deals with subject matter that is different from the topic concerning the maze. For example, with the first question, a selection of answer b) can cause the user to be sent to a node in which the subject of the query is physics, for example a question such as: "what is smaller than a muon?" Similarly, a choice of c) sends the user to a question concerning Star Trek, for example: "what did Spock say to Kirk on Romulan IV?" Similarly, selection of response d) sends the user to the same node as that of response c). Selection of response e) sends the user to the same node as that for selection of response b). In this example, the first question represents a three-way branch, where four wrong answers lead to two incorrect paths. With the off-topic nature of the questions encountered in the incorrect paths, the user should realize that they have made an error in at least one previous response, and should attempt to locate a path that brings the user closer to the exit of the maze.

This use of off-topic questions as a feedback or guide is a simple example of a more general idea of how "knowledge structures" can be mapped onto the basic information-space structure. In instances where incorrect choices have been made, it is possible to provide both subtle and not-so-subtle clues to the player that should cause them to consider that they may be veering off the main path of the maze. The concept of mapping knowledge structures onto basic information space structures in accordance with embodiments of the disclosed system and method may be applied in a variety of settings for educational purposes.

For example, a maze can be created from information on gastrointestinal (GI) physiology. In such a maze, the first questions could begin in the oral cavity, and as long as players were selecting correct answers, they would move on to questions on the esophagus, then on the stomach, then on the small intestine, and so forth. Incorrect answers could lead in a "backwards" direction, i.e. back towards the mouth and/or more laterally, i.e. out of the GI tract and into e.g. surrounding tissues and organs. Note that this "additional" structure does not change the basic maze algorithm, which is to navigate along correct bits of information (and to avoid choosing false bits of information). This design approach provides additional clues to solve the maze puzzle in a manner that both helps the player and that increases the interest and/or fun of playing the maze game. This option is not limited to simple physical structures—all manner of knowledge structures can be incorporated, e.g. navigating through geological time frames and fossil strata or navigating through a maze designated as being on "$15^{th}$ century Spain". In this latter case, incorrect choices might take the player to different geographical locations (other countries), to other historical times or some combination of both.

Alternately, the user can backtrack to a previous question to attempt to determine where the error occurred. In accordance with an embodiment of the present invention, backtracking to previous questions can be prevented or limited to increase maze difficulty. In the implementation of nodes as web pages, a back button can be enabled or disabled depending on the level of difficulty desired or location within the logical maze.

According to an embodiment of the present invention, the user may initially be presented with information about the educational, training or testing content of the maze, as well as information about the maze structure and rules. In this way, the user is prepared with the subject matter topic to more easily identify when the queries are off topic. In addition, upon completion of the maze, a maze section or a maze level, summaries or answers of the queries can be provided to the user. Alternately, or in addition, automated feedback to individuals completing the maze can be provided, as well as automated feedback to an instructor or administrator. In accordance with an embodiment of the present invention, the introductory information and completion feedback are implemented using HTML web pages and web-page authoring tools.

A number of variations are possible within a maze setting, including maze 100, for modifying the educational, training or testing experience. For example, a maze may be arranged such that upon an incorrect response, the user is permitted to return to a main path toward the exit with three correct responses in a row. Such a mechanism can be modeled as a jump through a "secret doorway," for example, as is sometimes available in popular entertainment video games. Likewise, various secret bonuses or occasional main path acknowledgement indications can provide intermittent rewards. The use of occasional rewards contributes to linking the efforts of the user with a motivational experience. The intermittent rewards may also be linked with maze design statistics to contribute to providing specific encouragement and motivation for the user. In addition, a maze may be used in a group setting, such as a class broken down into team groups that each try to complete the maze. Multiple individuals or groups attempting the maze need not be locally proximate, but can interact with each other or the maze over large geographical separations. The maze may be used with an "open book" format to assist with students and trainees developing skills in quickly locating information, which also may be combined with a competition, for example.

The didactic contributions of the educational maze game differs significantly from other types of educational or training approaches, and also differs from other kinds of maze games, where correct answers are used to move forward. In the system and method of the present invention, the user is not informed if they are on a path leading to the exit or not, and also are not informed whether they have correctly answered a given question. This approach provides the added dimension of encouraging the user to judge the probability that the answer at each stage is correct, so that internalized assumptions and knowledge are reevaluated throughout the exercise, leading to a deeper and better understanding of the subject matter. These advantages are also applicable in a group setting where a number of individuals or groups interact with each other to accomplish the goal oriented exercise of completing the maze. The maze design itself can be based upon principals related to statistics, cognitive psychology and learning mechanisms which are known with respect to educational environments, to help tailor the maze to the given discipline or educational/training/testing level. The mazes can be made to be arbitrarily difficult to suit specific groups of users, subject matter or other criteria in which maze difficulty can be a factor.

In an exemplary embodiment, maze difficulty can be adjusted with a number of possible routes through the maze. The number of possible routes scales exponentially with the number of queries. For example, if the queries have two possible responses, the number of possible routes can scale by $2^N$ where N is the number of questions within the maze. The maze design can be statistically analyzed to determine the probability of being able to correctly navigate the maze by chance. This type of probability analysis can contribute to setting an upper limit for difficulty for each maze design. As another example, a maze having 4-way branch points is more difficult than the example where each query has two possible responses. The upper limit of difficulty is encountered if all questions in a given maze are so difficult that the player is guessing answers essentially at chance level. Arbitrarily easier mazes can be based on the decreasing difficulty of the individual queries, in conjunction with the estimated skill level of the user. For example, in an extreme case, if each query is 100% trivial to each user, then the users navigate the maze with 100% accuracy, regardless of the number of branch points in the overall maze structure. Accordingly, permitting the maze to be designed to be arbitrarily complex and difficult provides a means of tailoring the maze to the users and the subject matter. Other maze attributes may also be used to affect the difficulty of the maze, such as secret doors, the ability to backtrack from a given point, intermittent hints or help, and other features that tend to prevent or permit the user to reach the exit of the maze. As part of the maze design, users may be rewarded with advancement to higher levels, or other types of rewards, including entertainment, social related aspects or other rewards tailored to the user or subject matter. The use of rewards can substantially increase user motivation in assimilating the factual knowledge presented in the maze, especially in comparison with other study and review systems and methods.

A maze can also be reconfigured with different questions, or different logical paths for different individuals or groups. The ability to configure and reconfigure mazes can help to prevent users from attempting to derive shortcuts or "cheats" which are common, and indeed offered by design, in a number of recreational game settings. That is, an instructor may wish to avoid having the knowledge of how to transit a given maze being passed on to other students or trainees. The reconfigurablity of the maze design and subject matter help to avoid such situations.

As part of the design of a given maze, users can be provided with hints or clues as to whether they are on a path towards the exit or not. For example, a display can be provided to indicate that an error was made in previous responses, or that progress towards the maze exit is being made. These types of hints or clues can be purely directional, or can provide some level of information regarding earlier choices that were made, or can suggest resources that may help the player's progress. For example, a dead end section of a maze may cause a display to be presented to the user with an option to proceed to an earlier part of the maze and reevaluate the choices from that point. The educational maze application may also provide references to external educational or informational material at different locations in the maze, such as maze junctions, dead ends, section ends or between levels, for example. Information can include references to previous class lectures or reading assignments, or can direct users to other types of topical resources. The clues and information can also be made available selectively to different players or groups, or can be provided to all users equally. For example, some users may receive specific clues or information at specific points in time relative to a maze entry or start time. In addition, or alternately, users may receive suggestive information in specific maze locations as a result of their specific path or choices made while navigating the maze.

The information presented in the maze can be in a number of forms, including different types of visual media, such as video, graphical or text, audio media, tactile media, olfactory media, patterns, links to other references, and other types of presentations that contribute to indicating to the user their status with respect to transiting the maze, or presenting queries for response by the user. In addition, or alternately, the maze may be represented in the form of a virtual reality environment that may be related to the particular subject matter of the maze. A number of features of the disclosed system and method can be provided in the form of entertaining or engaging aspects of the maze, such as maze "dangers" that offer greater risk with the chance of greater reward, or represent a setback in transiting the maze. Many other gaming related techniques may also be applied to the maze to enhance the interest and engagement of the user with the subject matter. One example is the use of "maze monsters" that can be provided at specific points in the maze, or be randomly located, or are permitted to move throughout the maze to challenge users with further queries. The query provided by a maze monster can be topical, individually tailored and of random difficulty, for example. In addition, safe rooms or nodes can be indicated at particular node locations where the user is not confronted with a maze monster. Other techniques applied in typical entertainment games may also be used, including maze-wide announcements or "chatting" among players to communicate information to the users or groups to enhance the educational experience of transiting the maze. As a specific example, a maze constructed to emulate a cardiovascular system can be provided for users to learn about subject matter of the same topic. Maze monsters may be modeled after various parts of a cardiovascular system, or can simply challenge users on specific or general topics within the cardiovascular system. For example, a maze monster may question a user about "valves in the heart" when the user is located in that area of the cardiovascular system.

Figure 4A:
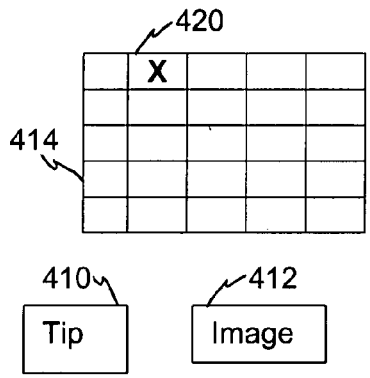
FIGS. 4a-4c are illustrations of queries in accordance with an exemplary embodiment of the present invention.
Figure 4B:
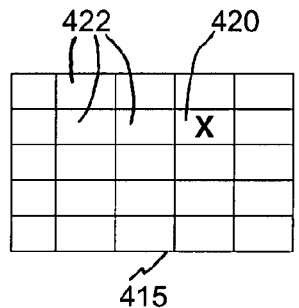
Figure 4C:
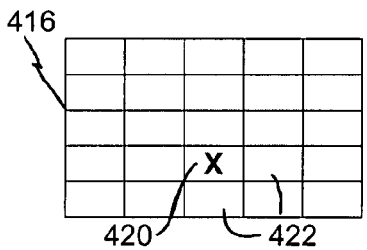

The maze can be provided as physical representations to the user, as distinguished from the logical maze path. A maze of this sort can be implemented on a web server by making each successive block in the maze a new web page and by making each choice/answer a link from one page to another page. Referring for example to FIG. 4, three different queries are illustrated as FIGS. 4a-4c. Each query is accompanied by a grid 414-416 showing a physical location of the user within the maze. Grids 414-416 provide a maze representation in which the user is informed of the entrance but not the exit to the maze. The user's progress through the maze is indicated by shaded blocks in grids 414-416. Referring to FIG. 4c, the current location of the user, indicated with an X, is the result of backtracking through the maze as indicated by the shaded areas of grid 416 in which the user proceeded along an incorrect path and did not find an exit. These visual kinds of assistance illustrating a physical representation of the logical maze provides an additional dimension of reasoning drawn on by the user to contribute to the problem solving aspect of navigating the maze while assimilating factual knowledge.

FIG. 4a includes assistance options in the form of selectable buttons 410 and 412. Buttons 410 and 412 provide help that can be in the form of "pull-down" boxes, for example, that reveal either a tip or an image that will provide educational and/or navigational help. Grids 414-416 provide additional help in the form of a visual representation of the information space that is being navigated. While there are multiple, important aspects of information space that cannot be easily mapped onto a 2-dimensional, visible representation of the maze (such as 5-dimensional structures and linkages between distant points in information space), it is generally possible to take the questions drawn from the information space and simply assign them to blocks in a 2-dimensional grid. Grids 414-416 could represent a maze of virtually any design that possesses up to 25 rooms nodes, for example. In the exemplary embodiments illustrated in FIGS. 4a-4c, the player's location is indicated with an X, while a current node 420 and previously visited nodes 422 are shaded, to indicate the player's prior path through the maze. Upon selecting a choice from the options shown, the player moves some direction in the associated information space, which is indicated by the X moving to a new block in grid 414, for example.

FIG. 4b shows the player's location at a further point in the maze where the player has traveled four blocks into the maze. While in this instance the player is on the Main Path, the player does not directly know this: whether the visible representation of grid 415 is provided or not, the player does not know where the maze exit is. The player's goal is in fact to discover the maze exit by choosing the correct bits of information to follow. Note that this game can be played with or without the visible representation of grids 414-416 and that in certain embodiments, tools are provided for instructors so that they have the option of toggling the representation of grids 414-416 on and off. Tools can also be provided to enable, disable or adjust other kinds of help within the maze. While some players may find that having a record of past places visited is helpful, other players may find such a visible representation to be distracting, especially since it may not easily capture important features of the information space. In some embodiments, the representation of grids 414-416 can be provided along with a tool to toggle grids 414-416 on or off, which may appeal to players that find the grid to be a distraction from the principal task of finding the correct path through information space.

In FIG. 4c, the player is shown at a deeper location in the maze, in this instance on a branch path. The player is attempting to answer a question about the rabbit retina and has pulled down a reference hint that may, among other things, reveal different nerve cell types in the rabbit retina. Note that because information space may not always neatly map on to physical space, choices made at node 420 of grid 416 may not move players to adjacent grid nodes. While one can seed the questions from information space into the 2D grid in a way to make it seem physically orderly, this generally works up to a point, because of the higher dimensionality and connections between distant points in information space. However, some players may find that by combining their knowledge about the questions with the clues provided by the visible representation they are able to better keep track of where they have been and the linkages between blocks/nodes as they seek to solve the maze puzzle. For such individuals, the visible representation can constitute a form of help.

It is straightforward to extend from these illustrations to mazes of considerable complexity and to implement devices and cues discussed above with the goal of providing interest and excitement while rewarding student knowledge and reasoning. Such tools as shown here, the visible maze and the within-maze help, can be readily implemented using flash media, and other web programming environments, based on use of commonly available programming skills and tools.

Maze designs can be provided as blank templates to permit instructors or administrators to insert queries and associated responses in relation to a given discipline. Any type of subject matter for any given discipline may be inserted into the maze in the form of a template, where the responses are matched with the maze design so that the path through the maze makes logical sense, as well as agreeing with the subject matter of the given nodes. The subject matter can be virtually any knowledge based discipline, including academic disciplines such as biology, health sciences, history, engineering, foreign languages and so forth. In addition, technical and professional disciplines can be drawn on for subject matter to implement a maze, including such disciplines as law, medicine, EMT-training, home-inspection licensing, computer system support, and so forth. Accordingly, the users and instructor or administrators can be within any range of school or training institutions, including seminars, conventions, graduate and professional schools and associations, and so forth.

Mazes can be provided as part of a course of instruction to contribute to freeing the instructor from spending valuable class time on rote memorization. As an example, a maze can be provided for students to use at a given time, so that students can compete individually or in groups to traverse the maze. In such a scenario, a number of different reward aspects can be provided, such as rewarding fastest time by a group, fastest time by an individual, rewards to all students who complete the maze or who complete the maze within an allotted time. Competitions can be implemented between different members of a class, a department, between institutions such as universities, or with other groups of users, such as professional societies.

Mazes can be implemented to include mixed subject matter, such as having content relevant to physics, math and materials for an engineering student. The maze can be made to be static for all players over a given time frame, or it can be made to change or be dynamic in structure. Various known game mechanisms may be employed with the maze, such as saving a given maze experience or making the maze available for entry at different levels, including entry at different levels of difficulty. For example, a user may progress to a certain point in the maze and wish to return to that point in another session of navigating the maze. In such an instance, the user can save the maze status, or can be provided with a special code or indication to start the user at the point at which they left the maze. Users may also be presented with options for the maze, including such criteria as level of difficulty, topics within a given area of subject matter and so forth.

The concept of the maze as a vehicle to navigate factual information to improve assimilation can be viewed in the abstract as navigating an informational space. The user acquires and is tested on factual information assimilation and retention in navigating the information space. Alternately, or in addition, the disclosed system and method can be viewed as transferring information from one source, such as a given textbook database, to a recipient, such as a user or a group of users. Accordingly, the present invention implements the concept of navigating an information space based on imperfect or partial feedback related to performance to transfer knowledge to the user.

The present invention also represents a number of possibilities with respect to other applications for the disclosed system and method. As an example, the use of an educational maze may be used in research or clinical settings to contribute to understanding and developing pedegological and cognitive techniques and capabilities. For example, such an educational maze may be used in psychological research or testing or in neuropsychology, where efforts are made to understand learning styles, the development of new skills, and how individuals assimilate information. The educational maze may also be used for developing group problem solving skills and relationships or to study the development of such skills and relationships. In addition, the use of an educational maze can be applied to situations in which there is not necessarily a single correct answer, such as in brainstorming sessions or situations in which some of the criteria may be considered subjective.

Figure 2:
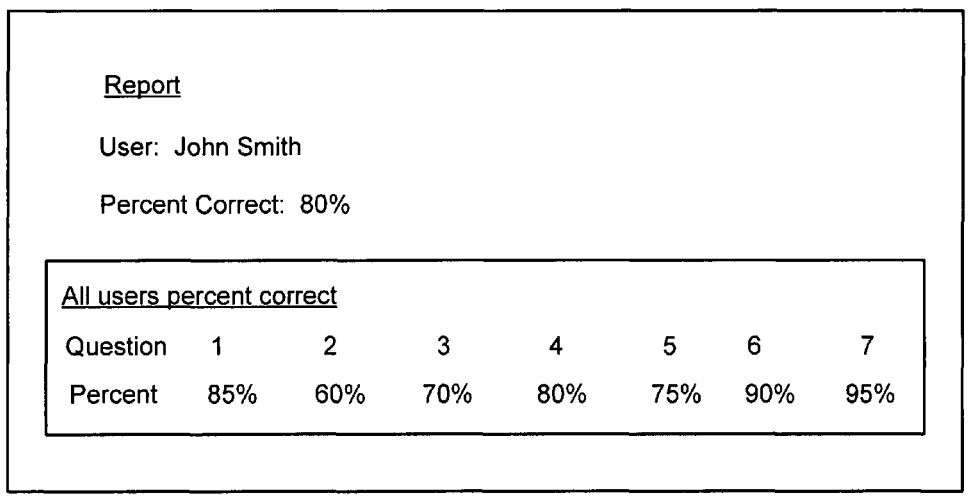
FIG. 2 is an illustration of a report in accordance with an exemplary embodiment of the present invention.

Instructors or administrators of a maze may also be provided with tools to construct mazes, import subject matter queries and response links associated with each node of the maze, and track user interaction with the maze. Referring to FIG. 2, the instructor may be provided with a feedback report, such as that illustrated, indicating how a given user performed in the maze. Statistical records can be maintained to track user performance and develop histograms for the difficulty of the questions, for example. Analysis of the results of the user's progress through a maze can help to inform classroom discussions or further instruction, such as by focusing on observed trends in user performance in a given maze.

The disclosed system and method may also be used in a test or examination setting to confirm or rate a student or trainee's grasp of the subject matter. Assimilation of new subject matter often occurs in a test or examination setting, so that the use of the disclosed system and method for testing a student or trainee provides further learning opportunities, as well as potentially heightened motivation. Examinations conducted by administering a maze may be based on a given time interval, or progress made through the maze by individual students or groups of students, for example.

The maze interface or presentation can be constructed to simulate various environments, and take advantage of known techniques of entertainment gaming. For example, 3-dimensional rendering of surfaces, background or other maze components, including representations of individuals, can enhance the user's experience. Such a rendered environment could also be suitable for simulating complex concepts, such as presenting a 3-dimensional representation of a cardiovascular or digestive system for a physiology related maze. As another example, animations can be used to represent concepts that are otherwise difficult to conceptualize, such as subatomic structures, chemical bonds and molecular configurations or astronomical configurations. For example, in a chemistry related maze, a user might, at a particular node, be presented with a scenario in which the user can move chemical bonds within a molecule to create a specific chemical compound. The user's choice of a position for the chemical bond or bonds determines their path through the maze to the next node or question. Thus, the maze itself is not limited to multiple choice questions, or even question and response type presentations, but can feature a variety of compelling presentations to assist in having the user assimilate the factual knowledge presented in the maze.

The presently disclosed system and method may be implemented in a number of formats, including on digital devices, such as PCs, wireless devices, home entertainment systems, and other types of devices that can simply represent a maze, or provide additional detail depending on the device capabilities. The present invention may also be implemented using a physical device, such as a board-style game or 3-dimensional puzzle-type game, for example.

Figure 3:
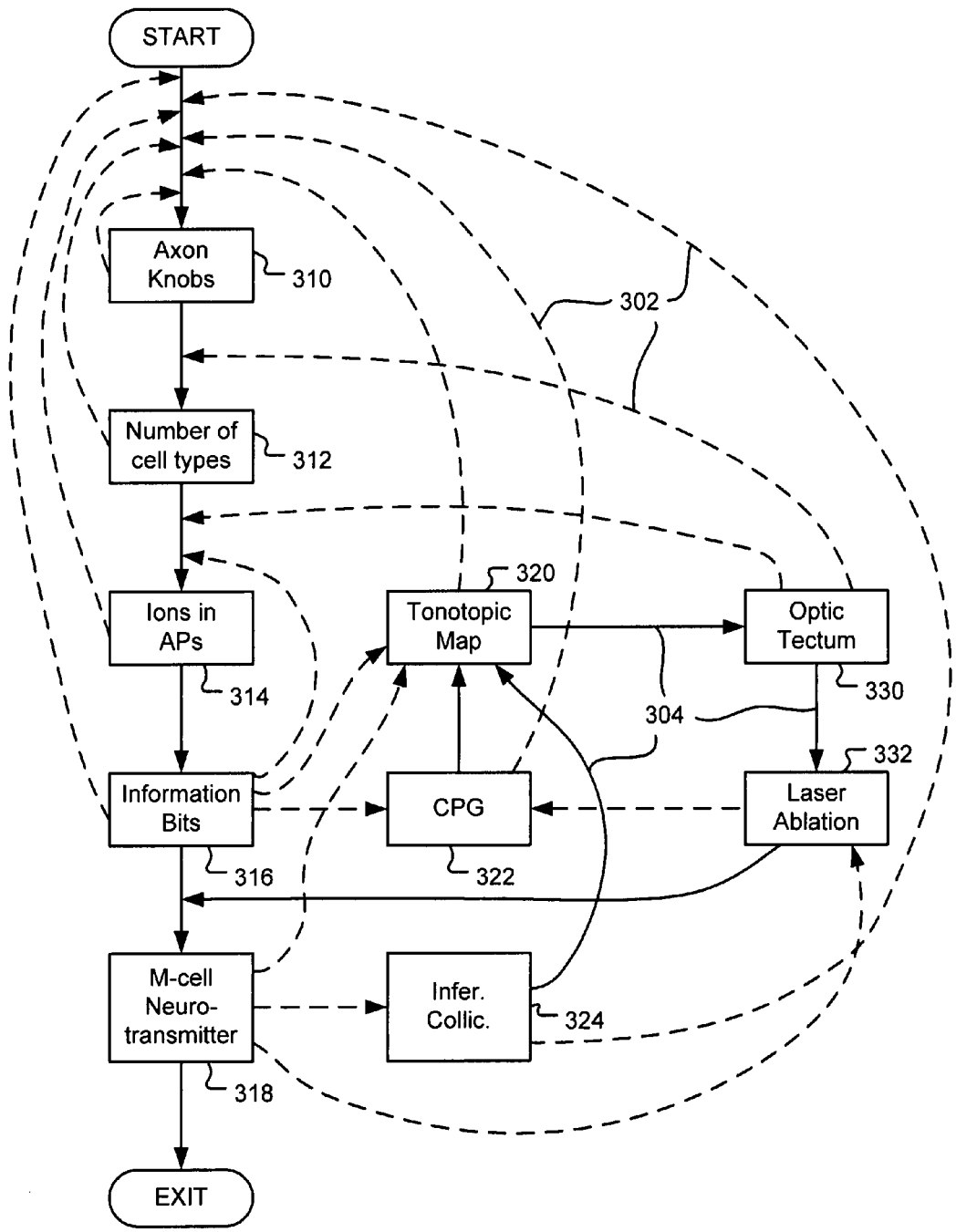
FIG. 3 is a diagram of a maze in accordance with an exemplary embodiment of the present invention.

Referring now to FIG. 3, a "looping" maze 300, in which backtracking is optionally permitted, is illustrated. Maze 300 represents a maze architecture that has no dead ends, and also permits the user to backtrack to a previous node to continue transiting through maze 300. Dashed lines 302 represent incorrect responses to the queries posed in the corresponding nodes, while solid lines 304 represent correct responses to the queries posed in the associated nodes of maze 300. The nodes shown in maze 300 may have more than one exit, represented by a dashed line 302 or solid line 304, meaning an incorrect or correct response, respectively. For example, node 316, with a query concerning information bits, has five possible exits, with one correct response causing the user to proceed to node 318. The remaining incorrect responses exiting from node 316 each represent different incorrect answers to the query posed in node 316. According to the incorrect response selected by the user, the user may be transferred to the beginning of the maze and node 310, or may be transferred to node 314, node 320 or node 322. If the user is directed to node 320 or 322, they can potentially return to a path toward the exit by correctly responding to the queries in node 320 or 322, and nodes 330 and 332. An incorrect response at node 318 similarly can transfer the user to node 320 or node 324, in which case the user can potentially repeat maze sections, including eventually node 318. One advantageous aspect to the construction of maze 300 is the ability of the user to become "lost" in the maze, so that progressing through various nodes does not necessarily bring the user closer to the maze exit. In such a scenario, the user navigates through the information space represented by the queries posed at the given nodes in maze 300 to assimilate the factual knowledge presented in maze 300, and eventually find the exit. As the user navigates through maze 300, problem solving skills are engaged in addition to knowledge assimilation, so that the user applies judgment and introspection into decisions made in selecting responses to the queries at given nodes.

Direct backward movement to a previous room may be disabled, which can offer an advantage in that it precludes serial guessing from a single room to determine what lies ahead. Because loops can be used to go backwards, forward and to add structure to branch paths, it is easy to design very complex structures based on the structural concepts of maze 300 in which players can become quite lost. In one exemplary prototype, looping-only mazes comprised of less than 20 total questions with only 6 or 7 questions along the main path were tested for difficulty. The tests of such looping mazes showed that, when challenging questions are used, it is useful to provide both within-maze educational content as well as navigational clues such as "you are halfway down the Main Path" or "you are off the main path, but two correct choices in a row will get you back on the Main Path." According to one embodiment, web-pages or presentation slides are linked together to create information-space style mazes of an almost endless variety of designs, including e.g. mazes that have both back-tracking enabled regions and pure-looping regions. According to one prototype maze, players making several wrong choices in a row are eventually sent back to the origin or starting node of the maze. While this action reveals that an incorrect choice had been made in the immediately preceding room, the user would not know at which earlier points they had made one or more errors that led them off the main path. As in other aspects of this maze game, such design features urge players to self-critically distinguish facts they know from other ideas or beliefs about which they will eventually realize that they should be less certain.

Maze 300 is of modest complexity, with 10 nodes, 5 of which comprise the main path. Yet, players became lost in this prototype maze game surprisingly easily. Note that this diagram represents the maze structure itself which is not shown to students but may be provided to maze administrators, such as teachers, so that they can see the layout of the maze. Editing tools may also be provided to the maze administrators, such as college professors who may wish to use a particular maze for a college class, so that they can edit the questions and answers in the maze game as provided to them so as to modify and incorporate the maze content to better reflect their teaching objectives. Higher level editing, for persons who would like to redesign the structures of mazes, by adding nodes and changing pathways, can also be enabled and can be used by publishers and other entities who would like to create different maze games. By providing templates and a graphical user interface for editing maze architectures, mazes of any desired extent and complexity may be created. While students generally are not shown the maze structure, some aspects or complete representations of the maze structure could be provided either as help during play of the maze game or as feedback upon completion of the maze. These aspects constitute additional options that the administrator of a specific instance of a maze game can select in accordance with their preferences.

With the availability of the above maze design options, a complex maze can be created with difficult questions, such that relatively few players/students can successfully navigate the maze in a reasonable time frame. There are many strategies for adjusting the navigation difficulty of the maze and for tailoring maze difficulty so that it is useful for players with a range of skill levels in the subject area of the maze. For example, the maze difficulty can be selectively maximized in cases where there is no within-maze help or clues offered. For example, a class or group of players can be provided with a series of linked mazes of increasing difficulty. The players can be provided with substantial help in easier or "novice" mazes and a decreased amount of help as players progress to "advanced" and then "expert" level mazes. An alternative approach is to provide time-dependent help, in which the instructor starts the maze for a class or group at a certain hour and sets time intervals after which increasing amounts of help are provided at one or more locations within the maze, helping players to solve the maze problem. The selectable levels of help permits the instructor to provide a strong challenge to the most accomplished students, while also providing sufficient help to the least accomplished students to have all students gain from the maze experience. The help can include navigational clues, as well as within-maze educational content that helps the player or players to correctly answer questions found at different maze locations. According to an exemplary embodiment, the educational maze options are implemented as software controls that are used to administer the maze. With the software controls, instructors can toggle on or off one or more help levels, or alternatively specify time intervals after which increasing amounts of help appear at the different locations in the maze. These features aid learning and motivate students to apply their knowledge in their efforts to solve the maze problem.

In accordance with an exemplary embodiment, the educational maze is implemented as a software application that may employ the internet. For example, an individual user (student/player) is provided with a copy of the game or a web-link to the game that enables them to play the game. The user logs into the game with a username and password to provide a restricted usage of the game. Logging in also permits the player's performance and choices in the maze to be recorded and analyzed to provide the maze administrator (e.g. a college or high-school teacher) with a record of individual student performance as well as aggregate class performance on the different questions in the maze. Other embodiments permit a teacher or instructor to project a maze in front of a group and allow individuals, small groups or the class as a whole (e.g. via electronic polling) to determine the path through the information space. This embodiment has a number of advantages, including providing a transition from a potentially boring platform-lecturing style of teaching to a game-playing atmosphere. In-class applications are useful in that the teacher immediately sees where students, groups or the class make mistakes and can then provide corrective instruction. Breaking the class down into groups also has substantial utility in that the groups can compete to make correct choices and find a correct path to the maze exit. Because peer-to-peer interactions within groups often have a greater dynamic than peer-to-instructor interactions, the in-class use of the disclosed system and method offers a great opportunity to enable peer-to-peer learning and teaching. This opportunity is also available in a "play-at-home" embodiment, since the class can be broken down into groups that will compete at a given time, e.g. 8:00 pm in the evening. At-home play is also useful for "open-book" style study and competitions as groups or individuals. Such an at-home format utilizes information literacy skills, such as the ability to quickly find and apply relevant knowledge, for example, from textbooks, the internet and other sources during such maze competitions. Such activities may tend to increase the amount of time students spend on absorbing the relevant subject matter. In addition, this novel learning and self-testing algorithm may motivate some students to study in advance of the time at which the maze is scheduled to be activated to enhance their competitiveness.

Different design options and educational features of the disclosed system and method have been laid out in the above discussion. In particular, it is possible to create mazes of sufficient complexity to bring self-judgment, self-doubt and motivation into play. It is also possible to regulate maze difficulty so as to produce an appropriate level of challenge. The player's motivation to identify the correct "bits of information" to navigate the information-space maze places greater importance and urgency upon identifying these correct bits of information (i.e., answers), than would be the case in more traditional study efforts such as self quizzes and on-line quizzes. The maze challenge thus confers on these questions an "intensity of interest" that promotes deeper thinking and greater consolidation and retention while the player solves the maze problem. Given the gaming nature of this activity, there are naturally many additional features that can be added to the game for purposes of aesthetics and producing excitement, using for example both auditory and visual enhancements of the basic game. Incorporation of features that add suspense or danger to the maze will also boost interest and excitement beyond what the basic maze algorithm generates. There are many potentially useful gaming features that can be incorporated into the educational maze. For example, a feature that may boost interest is illustrated with the case of a player going down an incorrect branch path. After successfully answering 3 difficult questions in a row, the player is told: "congratulations, you are being Teleported back to the Main Path and all Secret Doors are revealed." The player then finds themselves back on the Main Path, and upon going astray again finds that in certain rooms there are doors (visible objects to click on, for example) that are labeled "Secret" which when selected offer a question that if successfully answered returns the player back to the Main Path.

Disincentives for selecting incorrect answers can also be implemented. For example, sending players back to the origin or dropping them to a lower maze-level (in multi-level mazes) can be implemented as a penalty for selecting consecutive wrong answers, or for selecting particularly bad answers. This can also be done provisionally after e.g. providing warnings or educational guidance on actions the player should take before making further choices. For example, a player on a branch path, in an open book version of the game, might receive such a warning as: "you should read pages 200-201 in the textbook before proceeding!"

The present disclosure is not limited to maze type game formats, but can also be applied in other game formats representing a challenge to the user or users. For example, games such as multivariable step games, such as Mastermind®, where at each step one or more players try to guess a pattern of different indicators, such as colored pegs that are hidden from view, could also be used as a game vehicle. It should be apparent that any type of game that provides progressive steps can be employed to implement the concepts of the present invention.

While the disclosed system and method have been presented as a form of education, training or testing, the present invention is not limited to such applications. For example, a maze with deferred information about correctness of answers or maze location and direction may be applied in a recreational environment. For example, the disclosed system and method may be used to provide recreational games concerning trivia related to sports, history, movies or other bodies of common or arcane knowledge. In such configurations, the maze game may provide forms of rewards or detractions embodied as point systems, tokens or other types of rewards that may be common to a group of individuals.

Furthermore, the disclosed system and method is not limited to humans, but can be applied to animals for the purpose of training or testing, for example. For example, the disclosed system and method can be used to transfer knowledge or experience to animals or test their understanding of previous training.

In addition, the presented disclosed system and method may be implemented in a variety of formats, including on digital devices, such as PCs, wireless devices, home entertainment systems, and other types of devices that can represent a maze. The present invention may also be implemented using a physical device, such as a board-style game or a 3-dimensional puzzle-type game, for example. The invention may be implemented as a software application that is usable on a stand-alone device, a network connected device, such as a wireless device or as a server-based application accessible to a number of connected users.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for transferring knowledge to or testing knowledge of a user with a game implemented on a numerical computation device, the method comprising:
    providing a maze architecture representative of an information space and composed of interconnected nodes to form paths through the maze;
    providing a query and a plurality of responses, each response being associated with a path leading out of at least one node, one of the responses being a more correct response to the query than another response in the plurality, wherein the plurality of responses are not physical maze directions; and
    presenting the user with the query and responses associated with the at least one node when the user is represented as being located at the at least one node;
    receiving a response selection from the user;
    as a result of the response selection received from the user, representing movement of the user out of the at least one node along a path associated with the response selection received from the user in accordance with the maze architecture.

2. The method according to claim 1, wherein the maze architecture represents a logical maze.

3. The method according to claim 1, further comprising omitting altogether provision of an indication to the user of whether the user selected the more correct response.

4. The method according to claim 1, further comprising providing an indication of whether the represented movement is in a direction closer to a maze exit after the represented movement.

5. The method according to claim 1, further comprising providing suggestive information to the user related to subject matter of the query or maze location or path after the represented movement.

6. The method according to claim 5, wherein the suggestive information is reference material related to the subject matter of the query.

7. The method according to claim 5, wherein the suggestive information is a query associated with the another node.

8. The method according to claim 5, wherein the suggestive information relates to the subject matter of the query at the at least one node or a previously traversed node.

9. The method according to claim 5, wherein the suggestive information relates to whether the user selected the more correct response to the query at the at least one node or a previously traversed node.

10. The method according to claim 5, further comprising providing suggestive information to the user based on a time interval related to navigating the maze.

11. The method according to claim 1, further comprising presenting to the user a representation of a physical maze corresponding to the maze architecture.

12. The method according to claim 1, further comprising providing a report containing information related to user performance for traversing the maze.

13. The method according to claim 1, wherein providing the maze architecture further comprises setting a maze difficulty level.

14. The method according to claim 13, wherein setting the maze difficulty level further comprises applying statistical methods to analytically determine a probability of successfully navigating the maze by chance.

15. The method according to claim 1, wherein the query is a multiple choice question.

16. The method according to claim 1, further comprising indicating to the user whether a response to a previous query was a more correct response.

17. The method according to claim 1, further comprising providing a reward to the user upon receiving one or more more correct responses.

18. The method according to claim 1, further comprising providing a reward to the user upon completion of the maze.

19. The method according to claim 1, wherein providing a maze architecture further comprises:
    providing a maze architecture template free of queries and responses associated with the nodes; and
    permitting entry of queries and responses associated with the nodes.

20. The method according to claim 1, wherein the interconnected nodes form one or more of a loop or dead end.

21. A system for transferring knowledge to or testing knowledge of a user with a game through a computer user interface, the system comprising:

a storage media for storing a maze architecture representative of an information space and composed of interconnected nodes to form paths through the maze;

a data structure in the storage media for storing a query and associated responses;

a processor operable to access program instructions on the storage media, the program instructions being executable by the processor to:

present the query and associated responses to the computer user interface in accordance with a representative node at which the user is represented as being located within the maze architecture;

receive a response selection from the user, wherein the response selection is not a physical maze direction;

as a result of the response selection received from the user, represent movement of the user out of the representative node along a path associated with the response selection received from the user in accordance with the maze architecture.

22. The system according to claim 21, wherein the maze architecture is a logical maze.

23. The system according to claim 21, wherein the processor is further operable to omit altogether presentation of an indication of whether the response selection is more correct than other responses associated with the query.

24. The system according to claim 21, further comprising suggestive information stored on the storage media related to the subject matter of the query or maze location, the processor being operable to provide the suggestive information to the user after receipt of the response selection.

25. The system according to claim 24, wherein the suggestive information is reference material related to the subject matter of the query.

26. The system according to claim 24, wherein the suggestive information is another query.

27. The system according to claim 24, wherein the suggestive information relates to the subject matter of the query in accordance with the representative node or a previously traversed node.

28. The system according to claim 24, wherein the suggestive information relates to whether the user selected the more correct response to the query in accordance with the representative node or a previously traversed node.

29. The system according to claim 21, wherein the processor is further operable to present a representation of a physical maze to the computer user interface corresponding to the maze architecture.

30. The system according to claim 21, wherein the processor is further operable to store performance information in the storage media related to user performance in transiting the maze.

31. The system according to claim 21, wherein the query is a multiple choice question.

32. The system according to claim 21, wherein the processor is further operable to present visual, audio, tactile or olfactory media representations to the computer user interface related to the query.

33. A computer implemented method for transferring knowledge to a user, comprising:

presenting a plurality of choices to the user that are not physical directions;

providing a set of logical paths, each path being associated with a choice in the plurality of choices;

accepting a selection of one of the choices by the user;

in response to the user choice selection, providing an indication of traversing the path associated with the user choice selection.

* * * * *